United States Patent
Wang et al.

(10) Patent No.: US 9,965,103 B2
(45) Date of Patent: May 8, 2018

(54) TOUCH MODULE AND TOUCH SCREEN

(71) Applicants: BOE TECHNOLOGY GROUP CO., LTD., Beijing (CN); BEIJING BOE DISPLAY TECHNOLOGY CO., LTD., Beijing (CN)

(72) Inventors: Mingchao Wang, Beijing (CN); Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/090,339

(22) Filed: Apr. 4, 2016

(65) Prior Publication Data
US 2016/0349879 A1 Dec. 1, 2016

(30) Foreign Application Priority Data

May 27, 2015 (CN) .......................... 2015 1 0280589

(51) Int. Cl.
*G06F 3/045* (2006.01)
*G06F 3/043* (2006.01)
*G06F 3/042* (2006.01)

(52) U.S. Cl.
CPC .......... *G06F 3/0436* (2013.01); *G06F 3/0421* (2013.01); *G06F 2203/04103* (2013.01); *G06F 2203/04109* (2013.01)

(58) Field of Classification Search
CPC ................... G06F 3/042; G06F 3/0436; G06F 2203/04109
See application file for complete search history.

(56) References Cited

U.S. PATENT DOCUMENTS

2008/0088593 A1* 4/2008 Smoot .................. G06F 3/0425
345/173
2010/0103641 A1* 4/2010 Cho .................... H01L 51/5246
361/829

(Continued)

FOREIGN PATENT DOCUMENTS

CN 101739178 A 6/2010
CN 102576265 A 7/2012
CN 103019471 A * 4/2013

OTHER PUBLICATIONS

First Chinese Office Action, for Chinese Patent Application No. 201510280589.X, dated Aug. 22, 2017, 21 pages.

(Continued)

*Primary Examiner* — Kent Chang
*Assistant Examiner* — Mark Edwards
(74) *Attorney, Agent, or Firm* — Kinney & Lange, P.A.

(57) ABSTRACT

In a touch module, a light emitted by the light source undergoes a total reflection in the third substrate. when a first spacer is pressed against a third substrate by pressing a location on a second substrate, the light undergoing the total reflection in the third substrate escapes out of the third substrate and irradiates onto a photosensitive part corresponding to the pressed first spacer, the irradiated photosensitive part generates an electrical signal, and a pressed location on the second substrate is determined by detecting the electrical signal transmitted to an optical current detection line electrically connected to the irradiated photosensitive part. The touch module may reduce the cost and is adapted to be applied to a large size touch screen.

9 Claims, 9 Drawing Sheets

(56) References Cited

U.S. PATENT DOCUMENTS

| | | | |
|---|---|---|---|
| 2010/0302196 A1* | 12/2010 | Han | G06F 3/0425 |
| | | | 345/173 |
| 2012/0268427 A1* | 10/2012 | Slobodin | G06F 3/042 |
| | | | 345/175 |
| 2014/0035836 A1* | 2/2014 | Cui | G06F 3/0421 |
| | | | 345/173 |
| 2014/0139489 A1* | 5/2014 | Hwang | G06F 3/042 |
| | | | 345/175 |
| 2015/0138161 A1* | 5/2015 | Wassvik | G06F 3/042 |
| | | | 345/175 |
| 2016/0253010 A1* | 9/2016 | Xu | G02F 1/13338 |
| | | | 349/12 |

OTHER PUBLICATIONS

Second Chinese Office Action, for Chinese Patent Application No. 201510280589.X, dated Nov. 15, 2017, 15 pages.

* cited by examiner

TOUCH MODULE AND TOUCH SCREEN

CROSS-REFERENCE TO RELATED APPLICATION

This application claims the benefit of Chinese Patent Application No. CN201510280589.X filed on May 27, 2015 in the State Intellectual Property Office of China, the whole disclosure of which is incorporated herein by reference.

BACKGROUND OF THE INVENTION

Field of the Invention

Embodiments of the present invention relates to a technical field of display, more particularly, relates to a touch module and a touch screen comprising the touch module.

Description of the Related Art

According to touch control mode, a touch screen may be sorted into a capacitive touch screen, an optical touch screen and a sonic touch screen, etc. The capacitive touch screen has many advantages, such as, multi-point touch function, high light transmittance, lower power consumption, high contact surface hardness, long service life, etc. Thereby, the capacitive touch screen is used widely in the present.

As for the capacitive touch screen in the prior art, a touch electrode of the capacitive touch screen generally is made of Indium Tin Oxides (ITO). Since the Indium is the rare metal, it increases the cost of the capacitive touch screen. Furthermore, the ITO is not adapted to produce a large size touch screen, limiting the application of the capacitive touch screen in a large size display.

SUMMARY OF THE INVENTION

The present invention has been made to overcome or alleviate at least one aspect of the above mentioned disadvantages.

Concerning the above, embodiments of the present invention are to provide a touch module and a touch screen to reduce the cost of the touch screen.

According to an aspect of the present invention, there is provided a touch module, comprising: a first substrate and a second substrate provided opposite to each other; a plurality of photosensitive parts arranged in an array on one side of the first substrate facing the second substrate; a plurality of optical current detection lines electrically connected to the plurality of photosensitive parts, respectively; a plurality of first spacers provided on one side of the second substrate facing the first substrate; a third substrate located between the first substrate and the second substrate and separated from the first spacer on the second substrate; and at least one light source provided at a side edge of the third substrate. A light emitted by the light source undergoes a total reflection in the third substrate. When the first spacer is pressed against the third substrate by pressing a location on the second substrate, the light undergoing the total reflection in the third substrate escapes out of the third substrate and irradiates onto the photosensitive part corresponding to the pressed first spacer, the irradiated photosensitive part generates an electrical signal, and a pressed location on the second substrate is determined by detecting the electrical signal transmitted to the optical current detection line electrically connected to the irradiated photosensitive part.

According to another aspect of the present invention, there is provided a touch module, comprising: a first substrate and a second substrate provided opposite to each other; a plurality of touch scanning lines located on one side of the first substrate facing the second substrate and electrically isolated from each other; a third substrate located between the first substrate and the second substrate and separated from the second substrate; at least one ultrasonic generator provided at a side edge of the third substrate; and at least one ultrasonic receiver provided at the other side edge of the third substrate opposite to the ultrasonic generator. A ultrasonic wave emitted by the ultrasonic generator undergoes a total reflection in the third substrate. When a location of the second substrate is pressed to contact a location of the third substrate, a part of the ultrasonic wave undergoing the total reflection in the third substrate escapes out of the third substrate, and an intensity of the ultrasonic wave received by the ultrasonic receiver, corresponding to a contacted location on the third substrate, becomes weak, and a pressed location on the second substrate is determined by detecting a condition where the intensity of the ultrasonic wave received by the ultrasonic receiver becomes weak during loading a touch scan signal in turn on the touch scanning lines.

According to another aspect of the present invention, there is provided a touch screen, comprising: a display panel; and the above touch module provided at a light output side of the display panel.

According to another aspect of the present invention, there is provided a display apparatus comprising the above touch screen.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
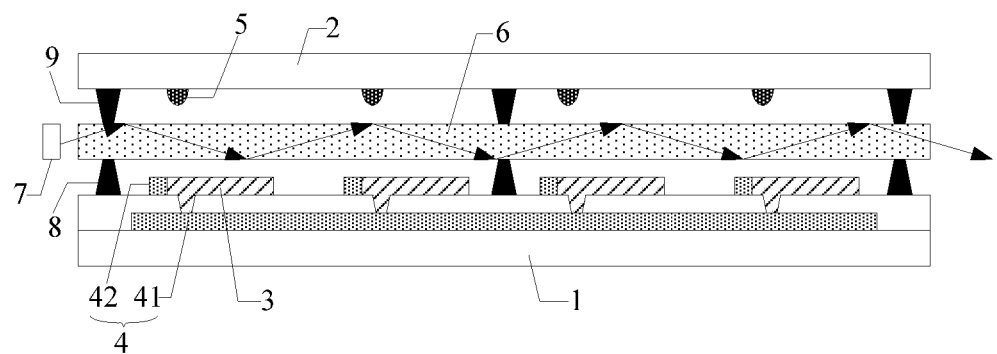
FIG. 1 is a principle cross section view of a touch module according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. Additionally, shapes and widths of elements as shown in Figs. are intended to illustrate the contents of the present disclosure, other than limit the real scale thereof.

Figure 2:
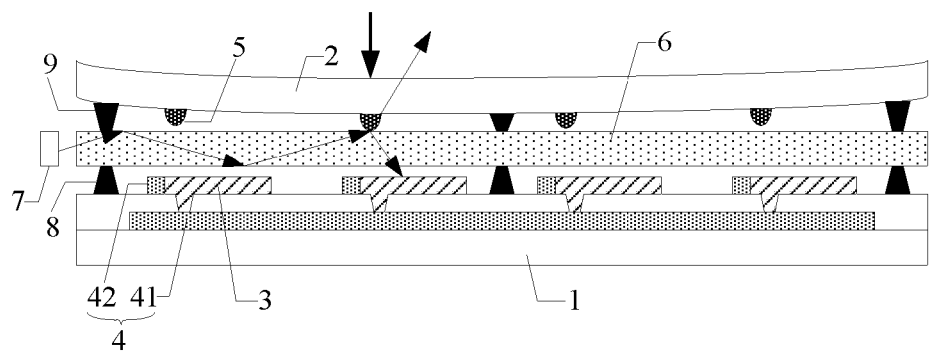
FIG. 2 is a cross section view of the touch module of FIG. 1 during being touched.

In an embodiment of the present invention, there is provided a touch module. As shown in FIGS. 1-2, the touch module comprises: a first substrate 1 and a second substrate 2 provided opposite to each other; a plurality of photosensitive parts 3 arranged in an array on one side of the first substrate 1 facing the second substrate 2; a plurality of optical current detection lines 4 electrically connected to the plurality of photosensitive parts 3, respectively; a plurality of first spacers 5 provided on one side of the second substrate 2 facing the first substrate 1, and being in correspondence to the plurality of photosensitive parts 3 one by one; a third substrate 6 located between the first substrate 1 and the second substrate 2 and separated from the first spacer 5 on the second substrate 2; and at least one light source 7 provided at a side edge of the third substrate 6.

As shown in FIG. 1, a light emitted by the light source 7 undergoes a total reflection in the third substrate 6. As shown in FIG. 2, if the first spacer 5 is pressed against the third substrate 6 by pressing a location on the second substrate 2, the light undergoing the total reflection in the third substrate 6 escapes out of the third substrate 6 and irradiates onto the photosensitive part 3 corresponding to the pressed first spacer 5, the irradiated photosensitive part 3 generates an electrical signal, and the pressed location on the second substrate 2 is determined by detecting the electrical signal transmitted to the optical current detection line 4 electrically connected to the irradiated photosensitive part 3. In the above embodiment of the present invention, the touch module may be an optical touch module with multi-point touch function. Since it does not need to use the rare metal, for example, indium, the optical touch module has a lower cost than the capative touch module. Furthermore, the optical touch module is adapted to be applied in a large size touch screen.

In an embodiment, the touch module comprises a plurality of strip-like third substrates 6 which are independent from each other. The third substrates 6 each corresponds to one row of photosensitive parts 3 or one column of photosensitive parts 3. The third substrates 6 each is provided with the light source 7 at the side edge thereof. In this way, the third substrate 6 is severed as a light guide member, the light emitted by each light source 7 is transmitted in the respective third substrate thereby increasing the intensity of the light. The third substrates 6 each extends in a row direction of the photosensitive parts 3 arranged in the array, and the third substrates 6 each corresponds to respective one row of the photosensitive parts 3; or the third substrates 6 each extends in a column direction of the photosensitive parts 3 arranged in the array, and the third substrates 6 each corresponds to respective one column of the photosensitive parts 3. The third substrate 6 may be separated from the photosensitive parts 3 and the optical current detection lines 4 on the first substrate 1. The light source 7 may be a laser, so as to improve the photoelectric conversion efficiency of the photosensitive part 3.

Please be noted that, in the above touch module according to embodiments of the present invention, the photosensitive parts correspond to the first spacers, respectively, that is, the number of the photosensitive parts is same as the number of the first spacers, and the photosensitive parts and the first spacers satisfy with position relation that when one of the first spacers is pressed against the third substrate by pressing the second substrate, laser escaping out of the third substrate irradiates onto the photosensitive part corresponding to the pressed first spacer as much as possible.

In the above touch module according to embodiments of the present invention, for an example where the third substrates each corresponds to the respective one row of photosensitive parts, the number of the third substrates is same as the number of the rows of the photosensitive parts, the third substrate and the respective one row of photosensitive parts satisfy with the position relation that when one of the first spacers is pressed against the third substrate by pressing the second substrate, the laser escaping out of the third substrate irradiates onto one of the one row of photosensitive parts corresponding to the third substrate as much as possible.

In an embodiment, if the third substrate extends in the row direction of the photosensitive parts, the third substrate may be located right above the respective one row of photosensitive parts. If the third substrate extends in the column direction of the photosensitive parts, the third substrate may be located right above the respective one column of photosensitive parts. In this way, when one of the first spacers is pressed against the third substrate by pressing the second substrate, it may ensure that the light escaping out of the third substrate irradiates onto the photosensitive part below the third substrate as much as possible, so as to increase the intensity of the light current generated by the photosensitive part. A touch location (the pressed location) on the second substrate may be identified by detecting the light current signal transmitted to the optical current detection line electrically connected to the irradiated photosensitive part, it may improve the touch sensitivity of the touch module.

In the above touch module according to embodiments of the present invention, the photosensitive part may be made of semiconductor material, for example, the photosensitive part may be made of, but not limited to, $n^+$-a-Si or $SiO_2$.

In the above touch module according to embodiments of the present invention, the third substrate may be made of organic glass. The refractive index of organic glass is 1.49, the refractive index of air is about 1, and the refractive index of organic glass is larger than the refractive index of air. Thereby, the light emitted by the laser may occur the total reflection in the third substrate.

Also, in the above touch module according to embodiments of the present invention, the material of the third substrate is not limited to the organic glass, for example, the third substrate may be made of any other suitable transparent material with a refractive index larger than that of air.

In the above touch module according to embodiments of the present invention, as shown in FIGS. 1-2, a surface of the first spacer 5 facing the third substrate 6 may be formed in a spherical crown shape. As a result, as shown in FIG. 2, when the first spacer 5 is pressed against the third substrate 6 by pressing the second substrate 2, the condition of the total reflection of the light is destroyed. In this case, when laser occurring the total reflection in the third substrate 6 irradiates onto an interface between the third substrate 6 and the first spacer 5, a part of the light is refracted at the interface and emits out of one side of the second substrate 2, and the other part of the light is reflected at the interface. Since the interface is formed as a curved surface, the reflection direction of the light at the interface is different from the initial total reflection direction of the light. As a result, the laser reflected at the interface may escape out of from one side (lower side in FIGS. 1-2) of the third substrate 6 opposite to the first spacer and irradiates onto the photosensitive part 3 on one side of the first substrate 1. In this way, the photosensitive part 3 generates the light current signal, and then the touch location on the second substrate may be identified by detecting the light current signal transmitted to the optical current detection line 4 electrically connected to the irradiated photosensitive part 3.

In the above touch module according to embodiments of the present invention, the first spacer may be made of quartz or glass. Because quartz and glass possess an enough hardness, when the first spacer is pressed against the third substrate by pressing the second substrate, it may ensure the first spacer not to be deformed, and hold the touch control function of the touch module.

Also, in the above touch module according to embodiments of the present invention, the material of the first spacer is not limited to quartz and glass. For example, the first spacer may be made of any other suitable transparent material with a certain hardness.

In the above touch module according to embodiments of the present invention, as shown in FIGS. 1-2, the touch module may further comprise: a plurality of second spacers 8 located between the first substrate 1 and the third substrate 6; and a plurality of third spacers 9 located between the second substrate 2 and the third substrate 6. The third spacer 9 has a height larger than a height of the first spacer 5. In this way, as shown in FIG. 1, when the touch module is not touched, it may ensure that the third substrate 6 is separated from the photosensitive parts 3 and the optical current detection lines 4 on the first substrate 1, and the third substrate 6 is separated from the first spacer 5 on the second substrate 2. That is, air gaps are formed at both sides of the third substrate 6. In this way, it may ensure that the light emitted by the laser 7 undergoes the total reflection in the third substrate 6 when the touch module is not touched.

In the above touch module according to embodiments of the present invention, as shown in FIG. 2, when the second substrate 2 is pressed, in order to protect the touch module from damage, the second spacer 8 and the third spacer 9 are required to have good elasticity, and are easy to recover after being compressed. Since the height of the third spacer 9 is larger than that of the first spacer 5, the third spacer 9 is required to have good elasticity, so that the first spacer 5 becomes in contact with the third substrate 6 when the second substrate 2 is pressed. Thereby, in the above touch module according to embodiments of the present invention, the second spacer 8 and the third spacer 9 are made of elastic material, for example, silica gel.

Also, in the above touch module according to embodiments of the present invention, the material of the second spacer and the third spacer is not limited to the silica gel. For example, the second spacer and the third spacer may be made of any other suitable transparent rubber material with good elasticity.

In the above touch module according to embodiments of the present invention, as shown in FIGS. 1-2, the optical current detection line 4 comprises a plurality of first optical current detection lines 41 electrically isolated from each other and a plurality of second current detection lines 42 electrically isolated from each other. The first optical current detection lines 41 are electrically isolated from and cross over the second current detection lines 42. The number of the first optical current detection lines 41 is equal to the number of the rows of the photosensitive parts 3. Each row of photosensitive parts 3 is electrically connected to respective one of the first optical current detection lines 41. The number of the second optical current detection lines 42 is equal to the number of the columns of the photosensitive parts 3. Each column of photosensitive parts 3 is electrically connected to respective one of the second optical current detection lines 42. Particularly, each first optical current detection lines 41 may be configured with three layer structures composed of molybdenum (Mo)-aluminum (Al)-Molybdenum (Mo). Each second optical current detection line 42 also may be configured with three layer structures composed of molybdenum (Mo)-aluminum (Al)-Molybdenum (Mo).

Also, the first optical current detection line and the second optical current detection line may be any other suitable metal line with good conductive performance.

Hereafter, it will describe in detail a method of manufacturing the above touch module mentioned in the above embodiments of the present invention by a specific example.

Figure 3A:
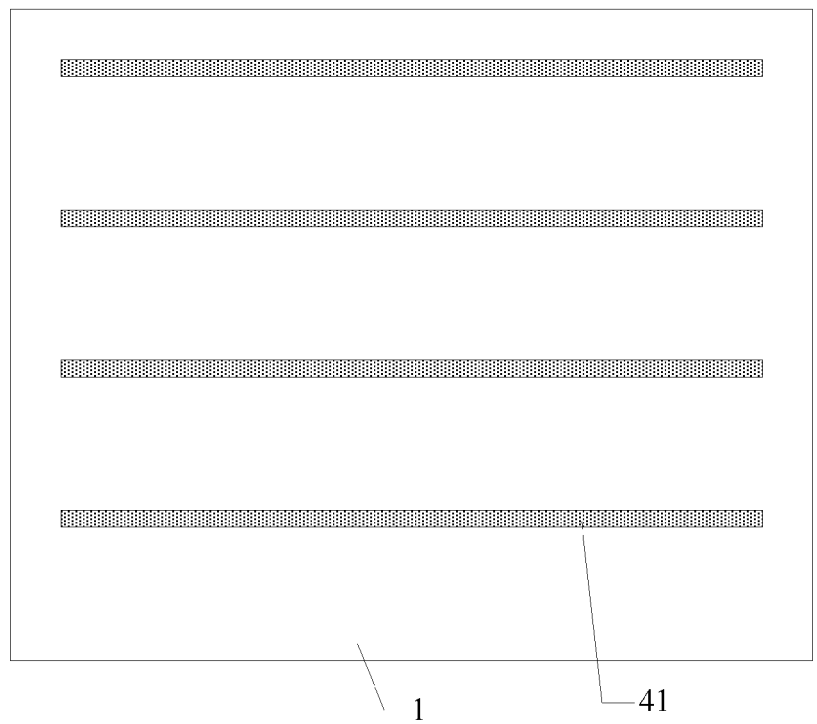
FIGS. 3a-3h illustrate plan views of the touch module after performing steps of manufacturing the touch module of FIG. 1, respectively, according to an exemplary embodiment of the present invention.
Figure 3B:
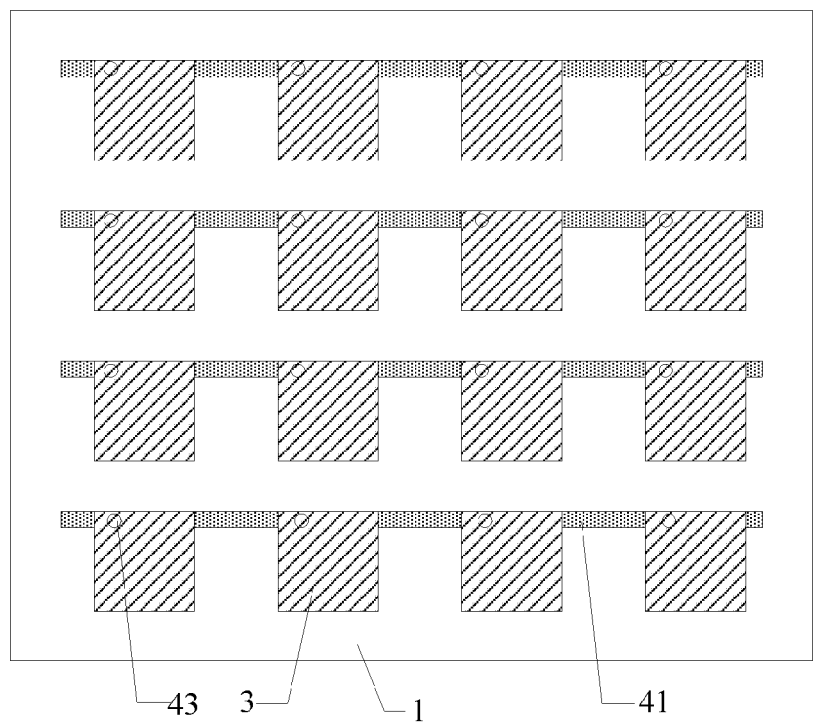
Figure 3C:
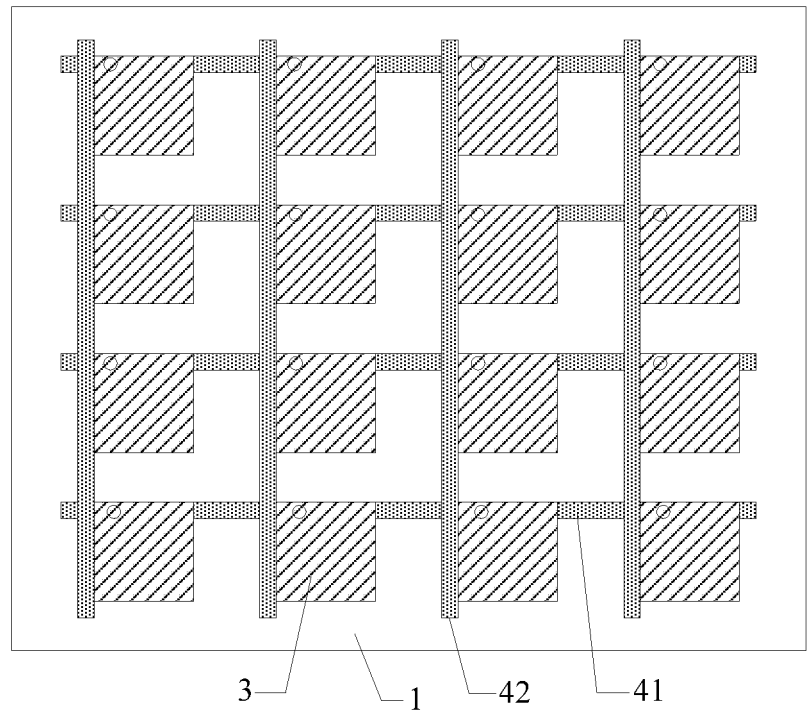
Figure 3D:
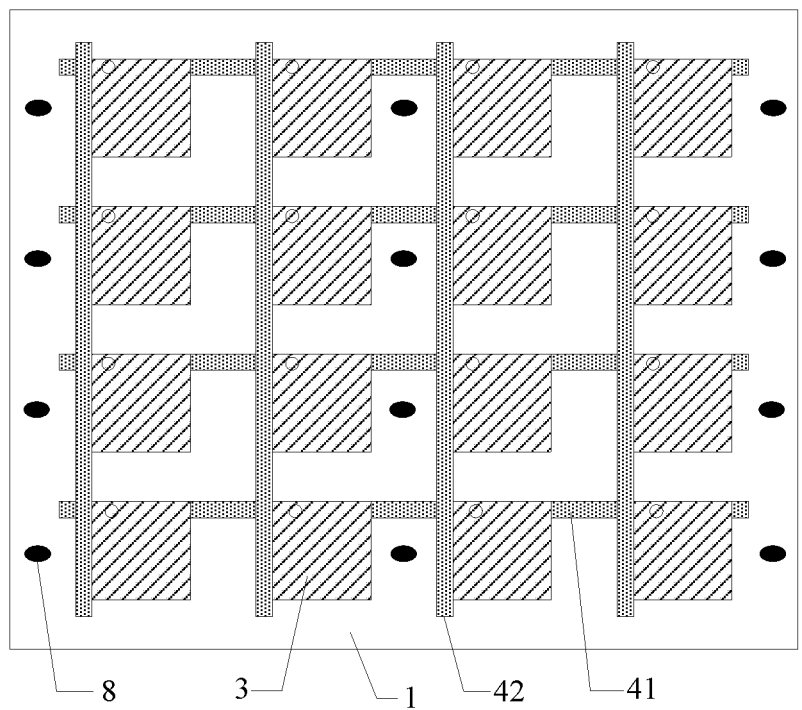
Figure 3E:
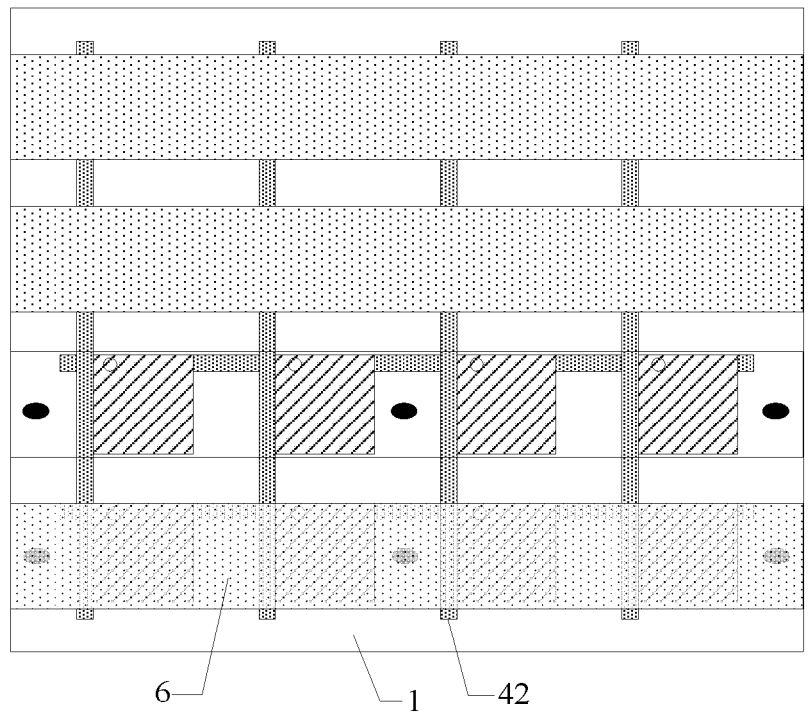
Figure 3F:
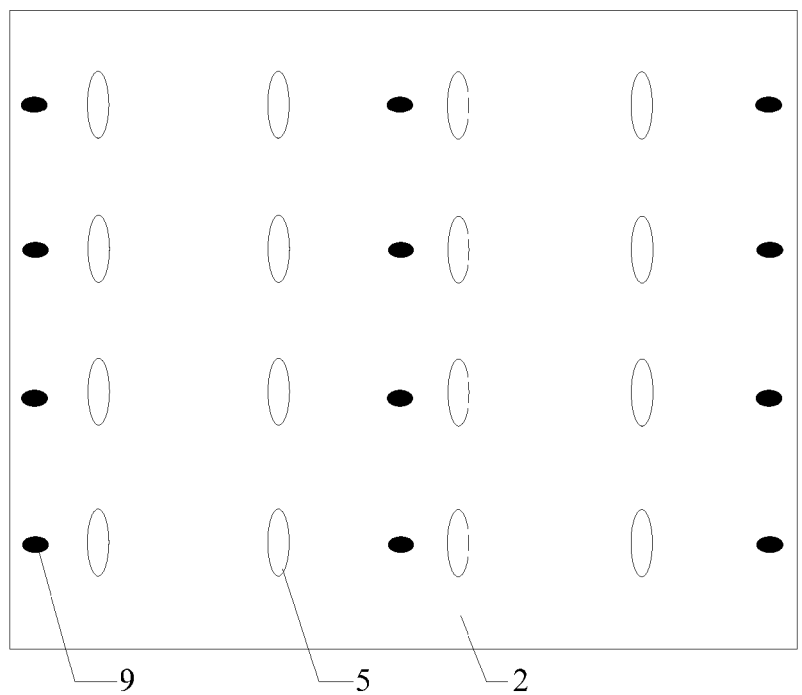
Figure 3G:
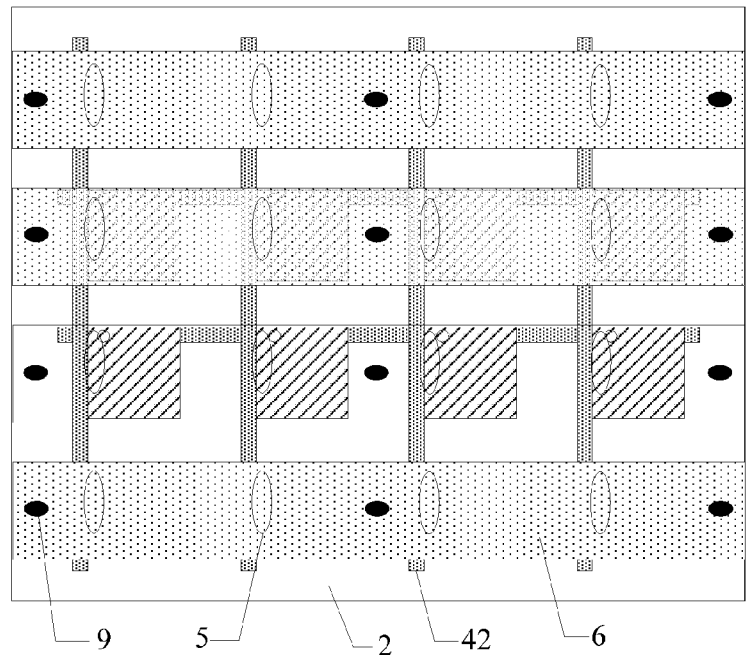
Figure 3H:
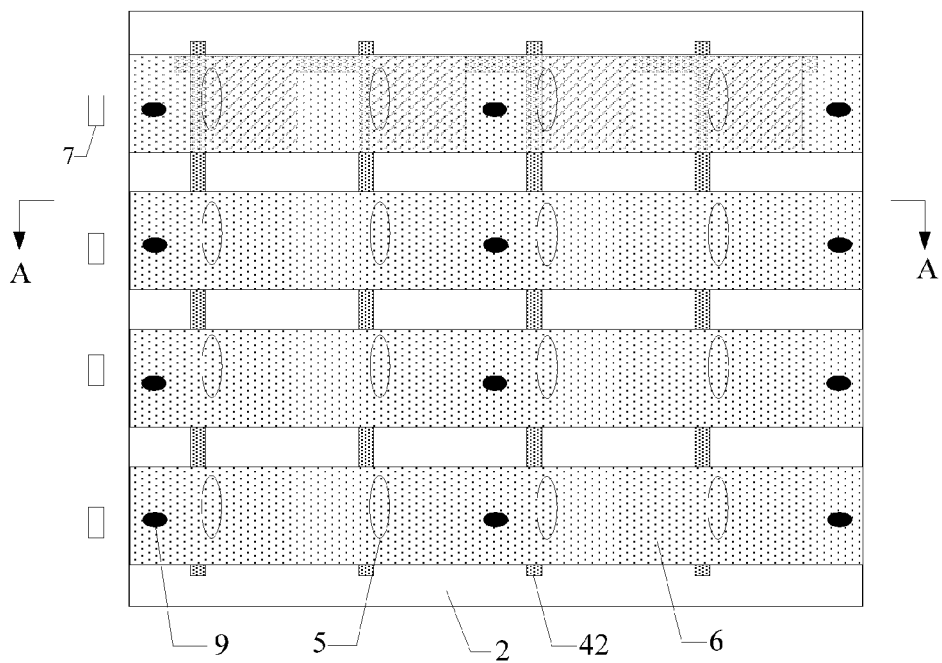

As shown in FIGS. 3a-3g, the method of manufacturing the touch module of FIG. 1 mainly comprises steps of:
1. forming a plurality of first optical current detection lines 41 on a first substrate 1, as shown in FIG. 3a;
2. forming an insulation layer (not shown) covering the first optical current detection lines 41 formed on the first substrate 1;
3. forming a plurality of photosensitive parts 3, arranged in an array, on the insulation layer, wherein each row of photosensitive parts 3 are electrically connected to respective one of the first optical current detection lines 41 through a via 43 running through the insulation layer, as shown in FIG. 3b;
4. forming a plurality of second optical current detection lines 42 on the first substrate 1 on which the photosensitive parts 3 are formed, wherein each column of photosensitive parts 3 are electrically connected to respective one of the second optical current detection lines 42, and the second optical current detection lines 42 are electrically isolated from the first optical current detection lines 41 through the insulation layer, as shown in FIG. 3c;
5. forming second spacers 8 on the first substrate on which the second optical current detection lines 42 are formed, as shown in FIG. 3d;
6. assembling third substrates 6 to the first substrate on which the second spacers 8 are formed, wherein the extending direction of each third substrates 6 is the same to the row direction of the photosensitive parts 3, that is, is the same to an extending direction of the first optical current detection lines 41, as shown in FIG. 3e;
7. forming first spacers 5 and third spacers 9 on a second substrate 2, as shown in FIG. 3f;
8. attaching a second substrate 2, on which the first spacers 5 and the third spacers 9 are formed, to the first substrate 1, on which the third substrate 6 is assembled, as shown in FIG. 3g;
9. mounting lasers 7 at an end (a side edge) of the third substrate 6, as shown in FIG. 3h, wherein FIG. 1 is a cross section view taken in a direction indicated by an arrow AA of FIG. 3h.

Based on the same inventive concept, in an embodiment of the present invention, there is also provided a touch screen comprises a display panel and the touch module according to the above embodiments of the present invention. The touch module is provided at a light output side of the display panel. Embodiments of the touch screen may be described with reference to the above embodiments of the touch module, and the embodiments of the touch screen are omitted herein for the sake of brevity.

The above touch screen according to the embodiments of the present invention may be applied to a Liquid Crystal Display (LCD); or the above touch screen according to the embodiments of the present invention may be applied to an Organic Light Emitting Diode (OLED).

In the above touch screen according to the embodiments of the present invention, the first substrate of the touch module is used as a substrate located at the light output side of the display panel. In this way, it may reduce the thickness of the touch screen. Particularly, if the display panel based on the above touch screen is the Liquid Crystal Display panel, the first substrate of the touch module is used as a counter substrate of the Liquid Crystal Display panel. If the display panel based on the above touch screen is a top emission type of OLED panel, the first substrate of the touch module is used as a cover plate of the top emission type of OLED panel. If the display panel based on the above touch screen is a bottom emission type of OLED panel, the first substrate of the touch module is used as an array substrate of the bottom emission type of OLED panel.

Based on the same inventive concept, in an embodiment of the present invention, there is also provided a display apparatus comprising the above touch screen. The display apparatus may be any product or device with display function, such as, mobile phone, tablet PC, television, monitor, notebook computer, digital photo frame, navigation, etc. Embodiments of the display apparatus may be described with reference to the above embodiments of the touch module, and the embodiments of the display apparatus are omitted herein for the sake of brevity.

Figure 4:
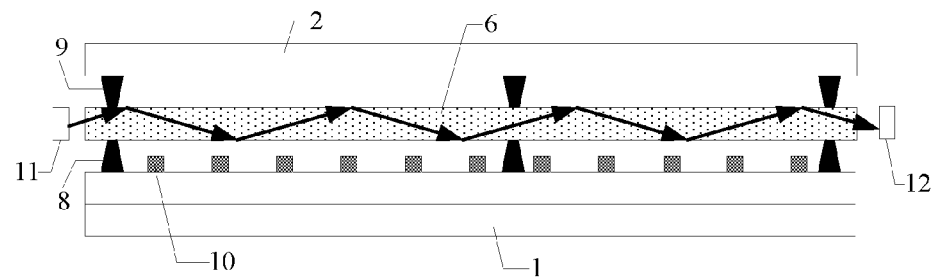
FIG. 4 is a principle cross section view of a touch module according to another exemplary embodiment of the present invention.
Figure 5:
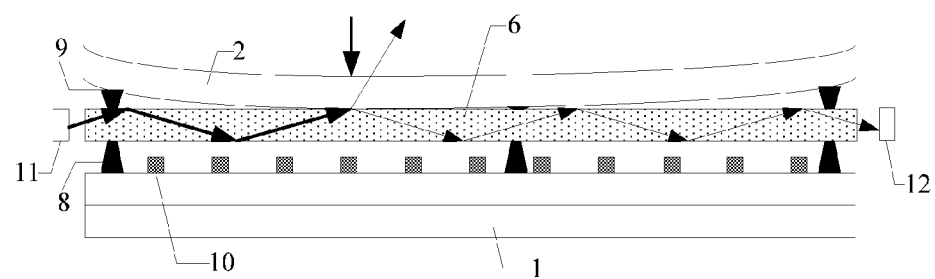
FIG. 5 is a cross section view of the touch module of FIG. 4 during being touched.

Based on the same inventive concept, in another embodiment of the present invention, there is provided a touch module. As shown in FIGS. 4-5, the touch module mainly comprises: a first substrate 1 and a second substrate 2 provided opposite to each other; a plurality of touch scanning lines 10 located on one side of the first substrate 1 facing the second substrate 2 and electrically isolated from each other; a third substrate 6 located between the first substrate 1 and the second substrate 2 and separated from the second substrate 2; at least one ultrasonic generator 11 provided at a side edge of the third substrate 6; and at least one ultrasonic receiver 12 provided at another side edge of the third substrate 6 opposite to the ultrasonic generator 11. As shown in FIG. 4, a ultrasonic wave emitted by the ultrasonic generator 11 undergoes a total reflection in the third substrate 6. As shown in FIG. 5, when the second substrate 2 is pressed to become in contact with the third substrate 6, a part of the ultrasonic wave undergoing the total reflection in the third substrate 6 escapes out of the third substrate 6, and an intensity of the ultrasonic wave received by the ultrasonic receiver 12, corresponding to a contact location on the third substrate 6, becomes weak, and a pressed location (or a touch location) on the second substrate 2 is determined by detecting a condition where the intensity of the ultrasonic wave received by the ultrasonic receiver 12 becomes weak during loading a touch scan signal in turn on the touch scanning lines.

The above touch module in this embodiment of the present invention is a sonic touch module with multi-point touch function. Since it does not need to use the rare metal, the sonic touch module has a lower cost than the capative touch module. Furthermore, the sonic touch module is adapted to be applied in a large size touch screen. Furthermore, the sonic touch module may overcome the touch insensitive disadvantage of the optical touch module resulted from the light from the backlight or the external environment.

In an embodiment, the touch module comprises a plurality of strip-like third substrates 6 independent from each other. The third substrates each is provided to across over the touch scanning line 10. The ultrasonic generator 11 and the ultrasonic receiver 12 are provided at opposite side edges of each of the third substrates 6, respectively. In this way, the third substrate 6 is severed as a wave guide member, the ultrasonic wave emitted by each ultrasonic generator 11 is transmitted in the respective third substrate. As a result, it may increase the intensity of the ultrasonic wave. An extending direction of each third substrate 6 is substantially perpendicular to the touch scanning line 10. The third substrate 6 may be provided to be separated from the touch scanning lines 10 on the first substrate 1.

In the above touch module according to embodiments of the present invention, the ultrasonic generator may be a piezoelectric ultrasonic generator, a magnetostrictive ultrasonic generator, or any other suitable ultrasonic generator, and not be limited thereto. The ultrasonic receiver may be a piezoelectric ultrasonic receiver, a magnetostrictive ultrasonic receiver, or any other suitable ultrasonic receiver, and not be limited thereto.

In the above touch module according to embodiments of the present invention, the third substrate may be made of organic glass. The acoustic impedance of organic glass is equal to $3.246 \times 10^6$ Kg/(m$^2$s), the acoustic impedance of air is equal to $0.000429 \times 10^6$ Kg/(m$^2$s). The acoustic impedance of organic glass is larger than the acoustic impedance of air. Thereby, the ultrasonic wave emitted by the ultrasonic generator may occur the total reflection in the third substrate.

Also, in the above touch module according to embodiments of the present invention, the material of the third substrate is not limited to the organic glass, for example, the third substrate may be made of any other suitable transparent material with an acoustic impedance larger than that of air.

In the above touch module according to embodiments of the present invention, the second substrate may be also made of organic glass. In this way, as shown in FIG. 5, when the second substrate 2 is pressed to become in contact with one of the third substrates 6, since the acoustic impedance of the second substrate 2 is equal to the acoustic impedance of the third substrate 6, thereby, the condition of the total reflection of the ultrasonic wave is destroyed. In this case, when the ultrasonic wave initially occurring the total reflection in the third substrate 6 is transmitted onto an interface between the second substrate 2 and the third substrate 6, a part of the ultrasonic wave is refracted at the interface and emits out of one side of the second substrate 2, and the other part of the ultrasonic wave is reflected at the interface. Since the interface is a flat surface, the reflection direction of the ultrasonic wave at the interface is the same as the initial total reflection direction of the ultrasonic wave. As a result, the ultrasonic wave reflected at the interface may escape out of from the side edge of the third substrate 6 near the ultrasonic receiver 12 and is received by the ultrasonic receiver 12 corresponding to the third substrate 6. Since a part of the ultrasonic wave escapes out of the third substrate, an intensity of the ultrasonic wave received by the ultrasonic receiver becomes weak. In this way, the touch location on the second substrate may be determined by detecting the intensity of the ultrasonic wave transmitted out of the third substrate 6 and received by the ultrasonic receivers 12 during loading a touch scan signal in turn on the touch scanning lines 10. For example, when the touch scan signal is loaded on one of the touch scanning lines 10, the ultrasonic receivers 12 detects the intensity of the ultrasonic wave transmitted out of the respective substrates 6, if the intensity of the ultrasonic wave detected by one of the ultrasonic receivers 12 becomes weak, it may determine the touch location at a cross position of the touch scanning line 10 and the respective third substrate 6.

In the above touch module according to embodiments of the present invention, as shown in FIGS. 4-5, the touch module may further comprise a plurality of second spacers 8 located between the first substrate 1 and the third substrate 6, and a plurality of third spacers 9 located between the second substrate 2 and the third substrate 6. In this way, as shown in FIG. 4, when the touch module is not touched, it may ensure that the third substrate 6 is separated from the touch scanning lines 10 on the first substrate 1, the third substrate 6 is separated from the second substrate 2. That is, air gaps are formed at both sides of the third substrate 6. In this way, it may ensure that the ultrasonic wave emitted by the ultrasonic generator 11 undergoes the total reflection in the third substrate 6 when the touch module is not touched.

In the above touch module according to embodiments of the present invention, as shown in FIG. 5, when the second substrate 2 is pressed, in order to protect the touch module from damage, the second spacer 8 and the third spacer 9 are required to have good elasticity, and are easy to recover after being compressed. Thereby, in the above touch module according to embodiments of the present invention, the second spacer 8 and the third spacer 9 are made of elastic material, for example, silica gel.

Also, in the above touch module according to embodiments of the present invention, the material of the second spacer and the third spacer is not limited to the silica gel. For example, the second spacer and the third spacer may be made of any other suitable transparent rubber material with good elasticity.

Hereafter, it will describe in detail a method of manufacturing the above touch module mentioned in the above embodiments of the present invention by a specific example.

Figure 6A:
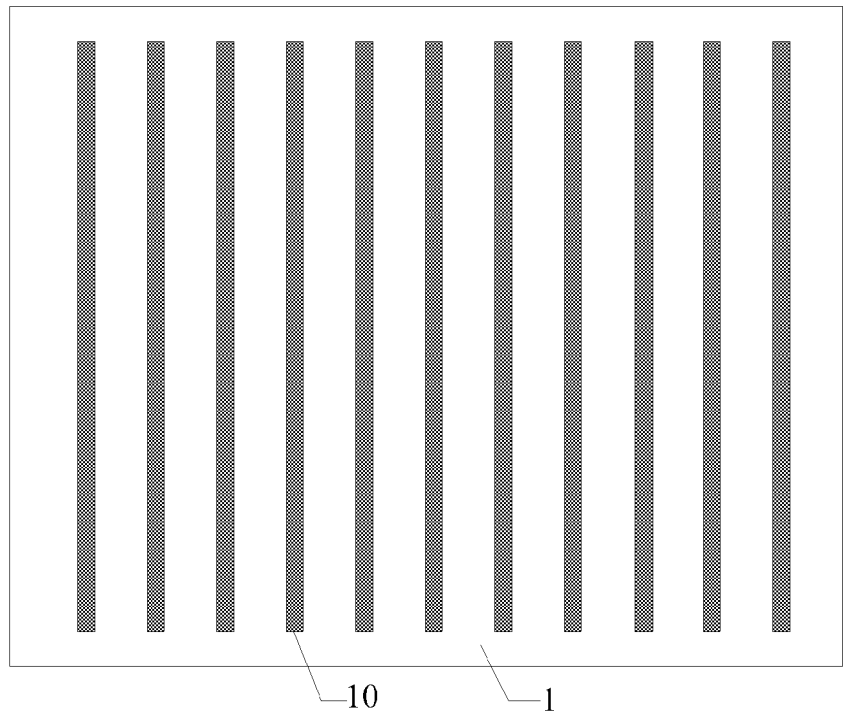
FIGS. 6a-6f illustrate plan views of the touch module after performing steps of manufacturing the touch module of FIG. 4, respectively, according to an exemplary embodiment of the present invention.
Figure 6B:
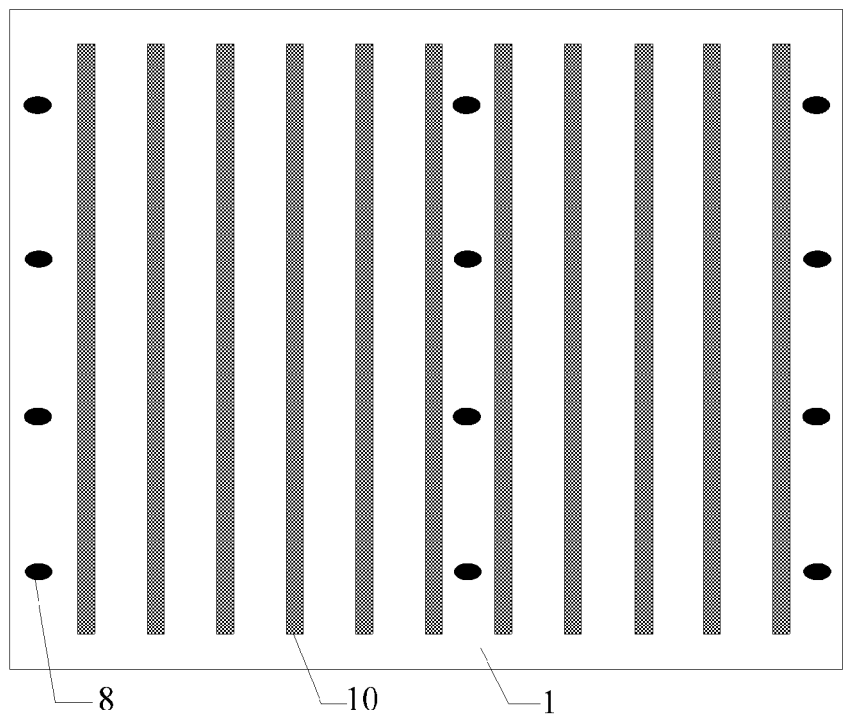
Figure 6C:
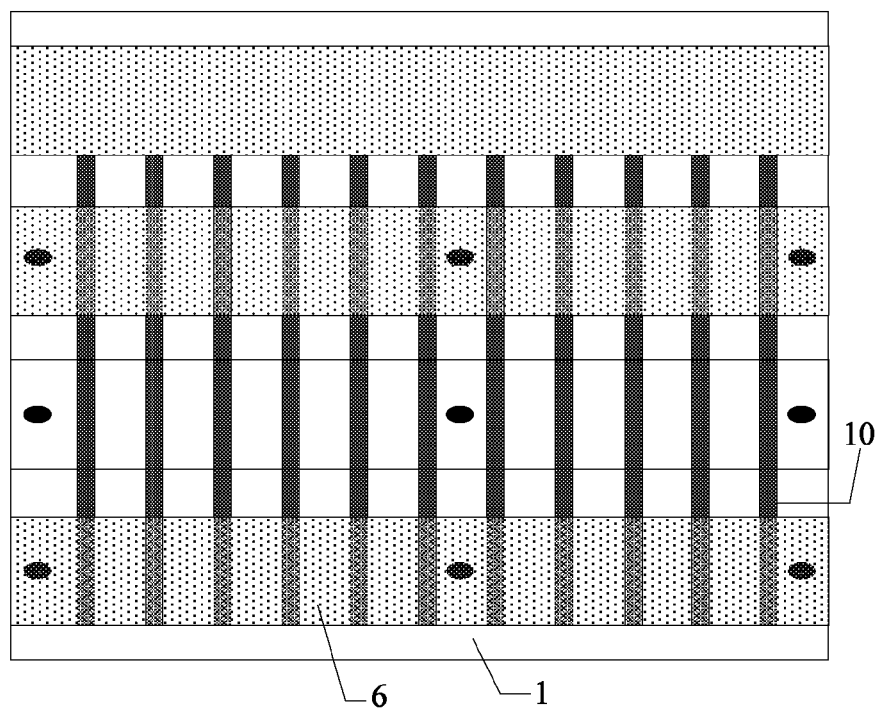
Figure 6D:
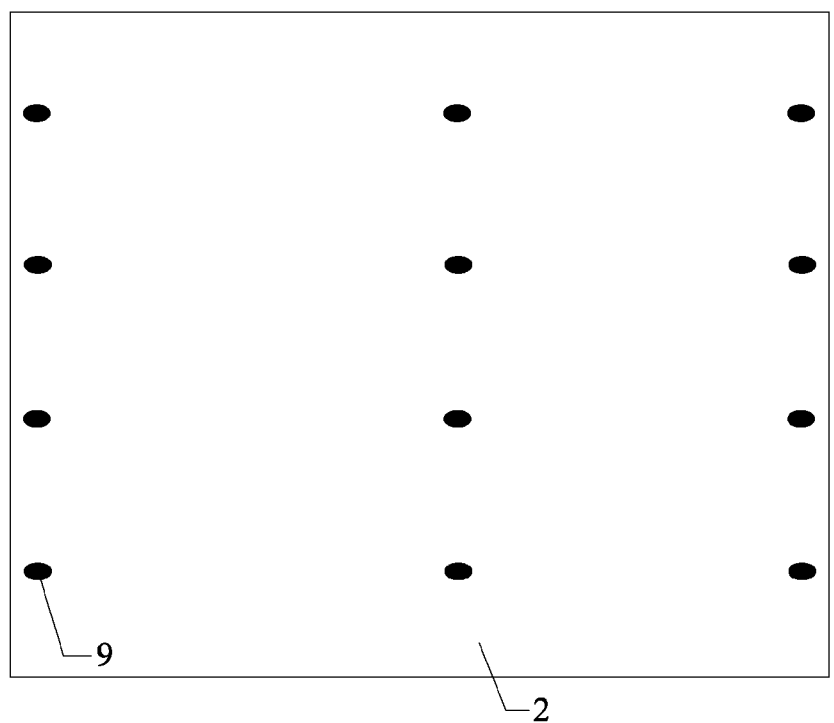
Figure 6E:
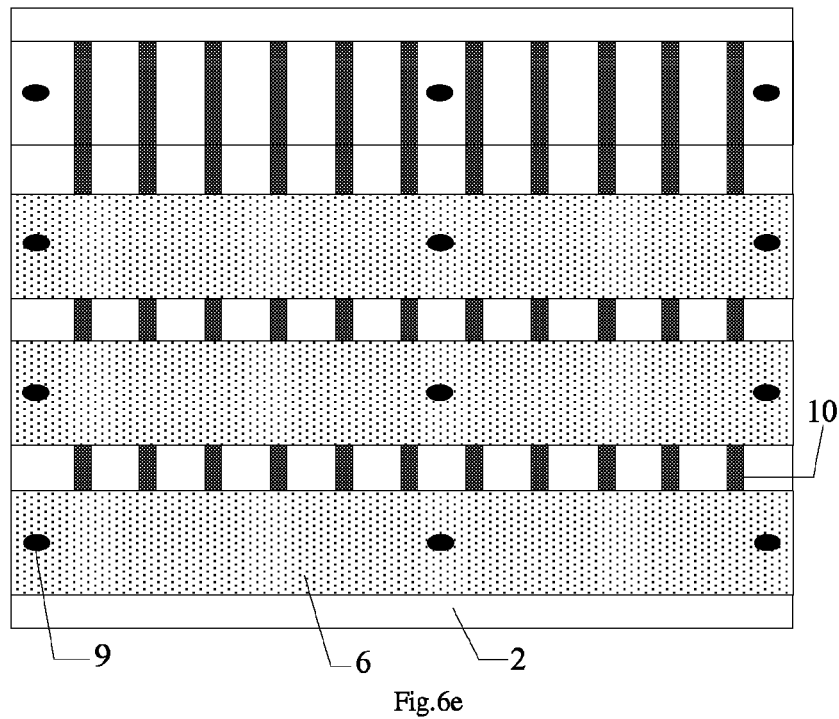
Figure 6F:
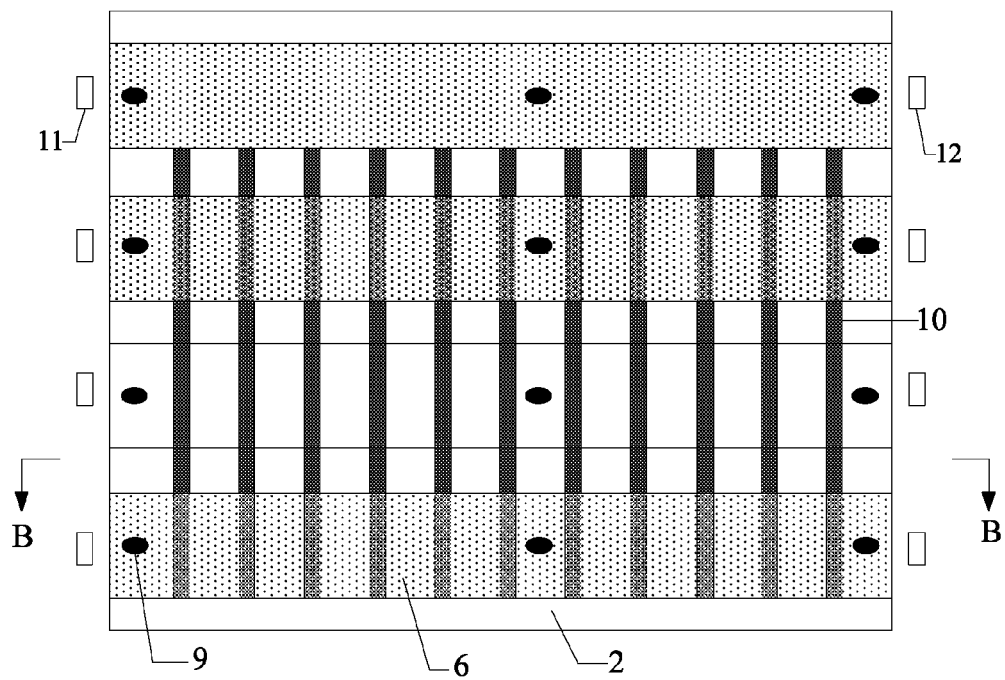

As shown in FIGS. 6a-6f, the method of manufacturing the touch module of FIG. 4 mainly comprises steps of:
1. forming a plurality of touch scanning lines 10 on a first substrate 1, as shown in FIG. 6a;
2. forming the second spacers 8 on the first substrate 1 on which the touch scanning lines 10 are formed, as shown in FIG. 6b;
3. assembling the third substrates 6 on the first substrate 1 on which the second spacers 8 are formed, wherein the third substrates 6 are provided across the touch scanning lines 10, as shown in FIG. 6c;
4. forming the third spacers 9 on the second substrate 2, as shown in FIG. 6d;
5. attaching the second substrate 2, on which the third spacers 9 is formed, to the first substrate 1, on which the third substrate 6 is assembled, as shown in FIG. 6e;
6. placing the ultrasonic generators 11 and the ultrasonic receivers 12 at opposite side edges (ends) of the third substrate 6, respectively, as shown in FIG. 6f, wherein FIG. 4 is a cross section view taken in a direction indicated by an arrow BB of FIG. 6f.

Please be noted that the present invention is not limited to the above embodiments, the touch scanning line may be not provided across the third substrate. When a touch action occurs, the touch location may be identified based on the intensity of the ultrasonic wave, transmitted out of the respective third substrates, detected by the respective ultrasonic receivers during loading a touch scan signal in turn on the touch scanning lines.

In another embodiment, the touch scanning lines may be replaced with a plurality of strip-like third substrates which are independent from each other, that is, two layers of third substrates crossing each other are provided. Provided that the first layer of third substrates extend in X-direction, and the second layer of third substrates extend in Y-direction. When a touch action occurs, the touch location in the X-direction may be determined by detecting the intensity of the ultrasonic wave transmitted out of the respective third substrates in the first layer. Similarly, the touch location in the Y-direction may be determined by detecting the intensity of the ultrasonic wave transmitted out of the respective third substrates in the second layer. In this way, the touch location on the second substrate may be determined based on the touch locations in the X-direction and the Y-direction.

Based on the same inventive concept, in an embodiment of the present invention, there is also provided a touch screen comprises a display panel and the touch module according to the above embodiments of the present invention. The touch module is provided at a light output side of the display panel. Embodiments of the touch screen may be described with reference to the above embodiments of the touch module, and the embodiments of the touch screen are omitted herein for the sake of brevity.

The above touch screen according to the embodiments of the present invention may be applied to a Liquid Crystal Display (LCD); or the above touch screen according to the embodiments of the present invention may be applied to an Organic Light Emitting Diode (OLED).

In the above touch screen according to the embodiments of the present invention, the first substrate of the touch module is used as a substrate located at the light output side of the display panel. In this way, it may reduce the thickness of the touch screen. Particularly, if the display panel based on the above touch screen is the Liquid Crystal Display panel, the first substrate of the touch module is used as a counter substrate of the Liquid Crystal Display panel. If the display panel based on the above touch screen is a top emission type of OLED panel, the first substrate of the touch module is used as a cover plate of the top emission type of OLED panel. If the display panel based on the above touch screen is a bottom emission type of OLED panel, the first substrate of the touch module is used as an array substrate of the bottom emission type of OLED panel.

Also, when the display panel having the above touch screen is applied to an Advanced Super Dimension Switch (ADS) type of LCD or an In-Plane Switch (IPS) type of LCD, it is necessary to provide a shielding electrode at the light output side of the LCD to avoid a disadvantageous interference of external signals to a common electrode and a pixel electrode inside the LCD. In this case, in order to further reduce the thickness of the touch screen and simplify the manufacturing process of the touch screen, the touch scanning lines of the touch module may be used as the shielding electrode of the display panel.

Based on the same inventive concept, in an embodiment of the present invention, there is also provided a display apparatus comprising the above touch screen. The display apparatus may be any product or device with display function, such as, mobile phone, tablet PC, television, monitor, notebook computer, digital photo frame, navigation, etc. Embodiments of the display apparatus may be described with reference to the above embodiments of the touch module, and the embodiments of the display apparatus are omitted herein for the sake of brevity.

According to the above embodiments of the present invention, there is provided a touch module, a touch screen and a display apparatus. In some embodiments of the present invention, the touch module is an optical touch module with multi-point touch function. In this case, since it does not need to use the rare metal, for example, indium, the optical touch module has a lower manufacturing cost than the capative touch module. Furthermore, the optical touch module is adapted to be applied in a large size touch screen. In some embodiments of the present invention, the touch module is a sonic touch module with multi-point touch function. In this case, since it does not need to use the rare metal, the sonic touch module has a lower manufacturing cost than the capative touch module. Furthermore, the sonic touch module is adapted to be applied in a large size touch screen. Furthermore, the sonic touch module may eliminate the touch insensitive disadvantage of the optical touch module resulted from the light from a backlight or external environment.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A touch module, comprising:
a first substrate and a second substrate provided opposite to each other;
a plurality of photosensitive parts arranged in an array on one side of the first substrate facing the second substrate;
a plurality of optical current detection lines electrically connected to the plurality of photosensitive parts, respectively;
a plurality of first spacers provided on one side of the second substrate facing the first substrate;
a third substrate located between the first substrate and the second substrate and separated from the first spacer on the second substrate;
at least one light source provided at a side edge of the third substrate, a light emitted by the light source undergoing a total reflection in the third substrate;
a plurality of second spacers located between the first substrate and the third substrate; and
a plurality of third spacers located between the second substrate and the third substrate and having a height larger than a height of the first spacer, the third spacers being aligned with the second spacers in a thickness direction of the third substrate one by one,
wherein when the first spacer is pressed against the third substrate by pressing a location on the second substrate, the light undergoing the total reflection in the third substrate escapes out of the third substrate and irradiates onto the photosensitive part corresponding to the pressed first spacer, the irradiated photosensitive part generates an electrical signal, and a pressed location on the second substrate is determined by detecting the electrical signal transmitted to the optical current detection line electrically connected to the irradiated photosensitive part, and
wherein the third substrate is separated from the photosensitive parts and the optical current detection lines on the first substrate, and the third substrate is separated from the first spacer on the second substrate, so that there are air gaps at both sides of the third substrate.

2. The touch module according to claim 1, wherein the touch module comprises a plurality of strip-like third substrates independent from each other, the third substrates each corresponds to one row of photosensitive parts or one column of photosensitive parts, and the third substrates each is provided with the light source at the side edge thereof.

3. The touch module according to claim 1, wherein the third substrate is made of organic glass.

4. The touch module according to claim 1, wherein a surface of the first spacer facing the third substrate is formed in a spherical crown shape.

5. The touch module according to claim 1, wherein the first spacer is made of quartz or glass.

6. The touch module according to claim 1, wherein the second spacer and the third spacer are made of elastic material.

7. The touch module according to claim 1, wherein the optical current detection line comprises a plurality of first optical current detection lines electrically isolated from each other and a plurality of second current detection lines electrically isolated from each other; and
wherein each row of photosensitive parts are electrically connected to respective one of the first optical current detection lines, each column of photosensitive parts are electrically connected to respective one of the second current detection lines.

8. A touch screen, comprising:
a display panel; and
the touch module, according to claim 1, provided at a light output side of the display panel.

9. The touch screen according to claim 8, wherein the first substrate of the touch module is used as a substrate provided at the light output side of the display panel.

* * * * *